United States Patent [19]

Whitaker

[11] Patent Number: 4,483,311

[45] Date of Patent: Nov. 20, 1984

[54] SOLAR POWER SYSTEM UTILIZING OPTICAL FIBERS, EACH FIBER FED BY A RESPECTIVE LENS

[76] Inventor: Ranald O. Whitaker, 4719 Squire Dr., Indianapolis, Ind. 46241

[21] Appl. No.: 521,291

[22] Filed: Jun. 27, 1983

Related U.S. Application Data

[63] Continuation-in-part of Ser. No. 304,182, Sep. 21, 1981, abandoned, which is a continuation-in-part of Ser. No. 220,442, Dec. 29, 1980, abandoned, which is a continuation-in-part of Ser. No. 82,906, Oct. 9, 1979, abandoned.

[51] Int. Cl.³ .................................................. F24J 3/02
[52] U.S. Cl. ................................. 126/440; 350/96.24; 350/96.25
[58] Field of Search .............................. 126/440, 451; 350/96.24, 96.25, 96.18

[56] References Cited

U.S. PATENT DOCUMENTS

| | | | |
|---|---|---|---|
| 3,603,723 | 9/1971 | Tan ................................... | 350/96.24 |
| 3,780,722 | 12/1973 | Swet .................................... | 126/451 |
| 4,026,267 | 5/1977 | Coleman ............................. | 126/452 |
| 4,101,188 | 7/1978 | Yevick .............................. | 350/96.25 |
| 4,201,197 | 5/1980 | Dismer ................................ | 126/451 |
| 4,282,858 | 8/1981 | Bowers ................................ | 126/440 |

FOREIGN PATENT DOCUMENTS 5714031  2/1979  Japan .

*Primary Examiner*—Carroll B. Dority, Jr.

[57] ABSTRACT

A mosaic of lenses is oriented to face the sun. Each lens focuses a solar image upon the open end of a respective optical fiber. The several fibers converge to form a bundle. The bundle passes to a receiver generally inside a building. The radiation delivered by the bundle may be used for cooking, lighting, operation of a thermodynamic engine, or other similar application. In the preferred system the lens mosaic is a plastic sheet into which lenses have been molded. In a first auxiliary system the lens mosaic is formed on the front surface of a transparent plate. Solar images are formed on the rear surface. Optical fibers are attached where these solar images are formed. This eliminates two reflecting surfaces, thereby increasing efficiency by 19%. In a second auxiliary system mass of the plate is reduced by using truncated cones to transmit the radiation to the solar image positions.

1 Claim, 4 Drawing Figures

SOLAR POWER SYSTEM UTILIZING OPTICAL FIBERS, EACH FIBER FED BY A RESPECTIVE LENS

This application is a continuation-in-part of application Ser. No. 06/304,182 filed 09/21/81 and now abandoned; which is a continuation-in-part of application Ser. No. 06/220,442 filed 12/29/80 and now abandoned; which is a continuation-in-part of application Ser. No. 06/082,906 filed 10/09/79 and now abandoned.

BACKGROUND

Conventional solar power systems utilizing optical fibers generally employ a single large lens (or mirror). An orientation system causes the lens to face the sun. The lens causes a solar image to be focused upon the open end of a bundle of optical fibers. For a typical system see Dismer, U.S. Pat. No. 4,201,197. The bundle is led into a building where the radiation is delivered to a receiver. In a variation of this system (Coleman, U.S. Pat. No. 4,023,267) a mosaic of lenses is provided. Each lens focuses a solar image upon the open end of a respective bundle of fibers. The result is a collector of far less bulk—a collector which may be fitted into a flat plate and neatly affixed to the roof.

A typical solar collector used to supply energy to homes generally has a diameter of 2 meters.

$$D = 2 \text{ m} \quad \quad 1.$$

Since the conventional optical fiber will accept radiation striking the fiber at an angle 30° off axis, the minimum focal length becomes $$FL = (D/2) \, ctn \, 30° \quad \quad 2.$$
$$= 1.732 \text{ m}$$

The sun subtends an angle of approximately 0.01 radians. Consequently the diameter of the solar image is given by $$ID = .01 \, FL \quad \quad 3.$$
$$= .0173 \text{ m or } 17.3 \text{ mm}$$

The largest commercially available optical fiber is 1 mm in diameter. Consequently the number of fibers which must be carried in a bundle the end of which will encompass the solar image is $$N = (DI/DO)^2 \quad \quad 4.$$

where
DI is the diameter of the solar image.
DF is the diameter of the fiber. Substituting in 4

$$N = (17.3)^2 = 300 \quad \quad 5.$$

The above figure would be correct were there no interstitial space between fibers. The interstitial space reduces the number of fibers required by 10%. However, a perfect solar image will never be obtained. Imperfection in the image will cause the number of fibers to be greater. The two errors tend to compensate each other. The figure obtained above appears sufficient for our purposes.

In the system of Coleman a matrix of lenses each estimated to be 600 mm in diameter is used. The resultant focal length becomes $$FL = (ID/SD) \, ctn \, 30° \quad \quad 5.$$
$$= 300 \times 1.732$$
$$= 520$$

The diameter of the solar image becomes $$ID = 0.01 \, FL = 5.2 \text{ mm} \quad \quad 6.$$

The consequent number of fibers required in the bundle becomes $$N = (ID/FD)^2 \quad \quad 7.$$
$$= (5.2/1)^2 = 26$$

While the system of Coleman is an improvement over the system of Dismer in that the bulk of the collector system has been reduced, the loss associated with the interstitial space remains undiminished.

Reflection losses plague optical systems such as that under discussion. Each refracting surface reflects approximately 10%. A conventional system gives reflections at
1. The front surface of the lens.
2. The rear surface of the lens.
3. The inlet end of the fiber.
4. The outlet end of the fiber.

The 10% loss at each surface causes a total loss of 35%. Consequently it is desirable to eliminate as many of the above reflecting surfaces as possible.

THE INVENTION

I was working with conventional flat plate collectors of the type used to heat homes. The radiation is absorbed at the collector and turned into sensible heat. This heat is transferred to a working fluid—glycol in our case. The fluid is pumped into the home where the heat is extracted and the fluid returned to the collector.

One of the shortcomings of this system is the loss of heat from the collector itself to the outside air. In the dead of winter this loss is from 50% to 100%. For still lower outside temperatures the loss can be greater than 100% if the system is allowed to run. When the most heat is needed, the least is provided. To eliminate this conduction loss, I considered using an optical fiber system. The conduction loss was eliminated, but a new loss was introduced—the 10% loss to the interstitial space between optical fibers. One way to reduce this interstitial loss is to make the fibers square or hexagonal. However, no such fibers were commercially available. If I were to use optical fibers I must be satisfied with cylindrical fibers.

Then the lightning struck! Reduce the size of the lens until the image would fall on the end of a single fiber! To get the required collector area, use a matrix of small lenses instead of a single large lens! Then gather the several fibers together into a bundle and lead the bundle into the home!

That was it. Very simple once the concept was born. But a most significant departure from the teachings of the past. Which teachings were that the lens should be as large as could be conveniently manufactured and used. And that the number of fibers in the bundle should be sufficient for the end of the bundle to encompass the solar image produced by that lens.

During the study of this matrix system—the lightning struck again. We could mold front surface lenses into a sheet of transparent material. Let each lens focus upon a respective spot in the rear surface. And attach a respective fiber to each of these spots. This would eliminate two of the reflecting surfaces discussed under BACKGROUND. Which would reduce the reflection loss from 35% to 19%.

THE PREFERRED EMBODIMENT

Figures 1, 2:
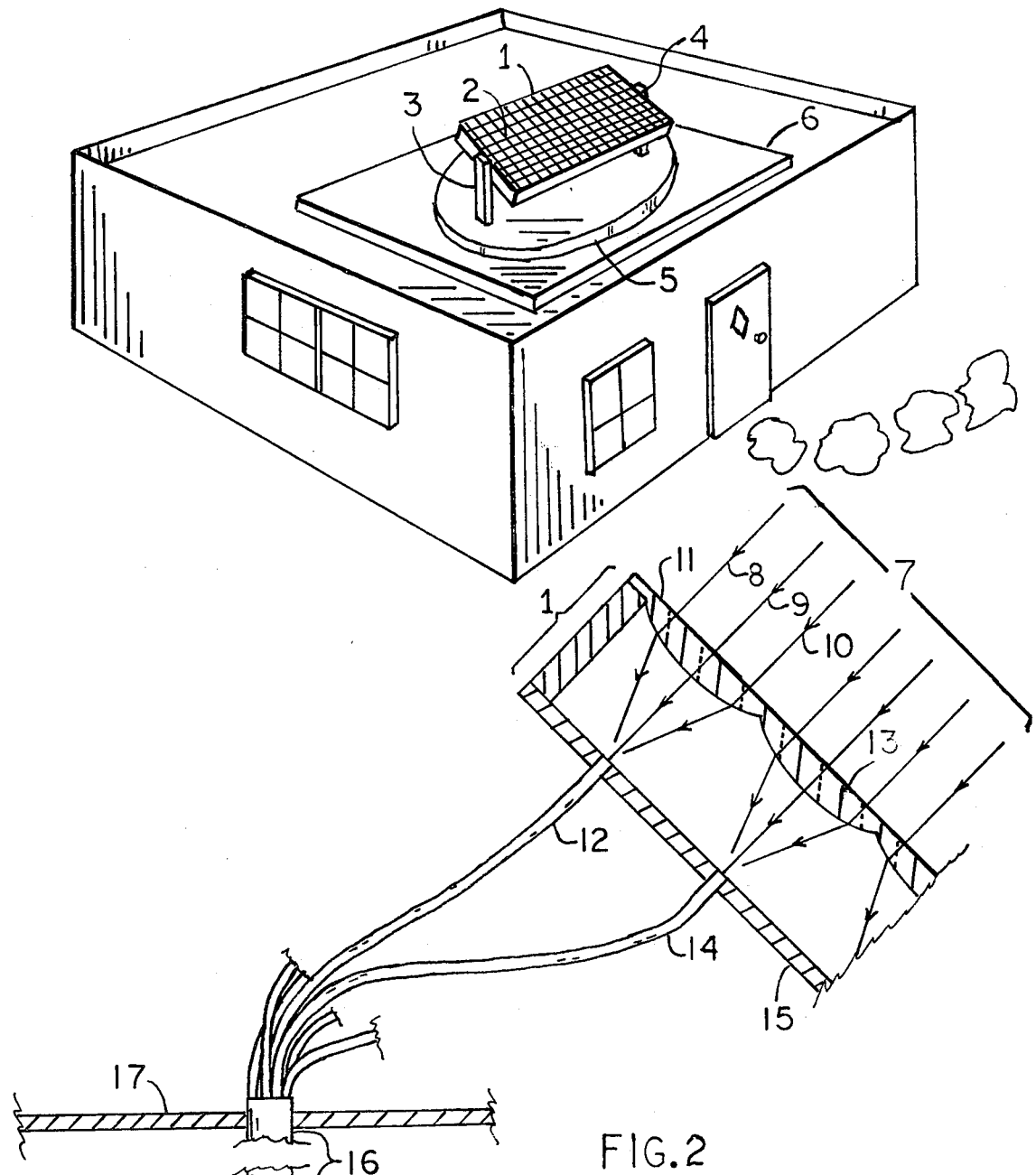
FIG. 1 shows a collector unit having an orientation system mounted on a building.
FIG. 2 shows a collector according to one embodiment of the invention connected to a water tank.

FIG. 1 shows a collector built in accordance with the present invention. It is positioned atop a building. Plate 1 carrying lens mosaic 2 pivots on bearings mounted in posts 3 and 4. Posts 3 and 4 carried by turntable 5, which rotates on base 6. The assembly forms what is known as a bi-axial orientation system. It is capable of turning the plate so that the plate faces the sun from sunup to sundown. In the preferred system a properly programmed computer provides the control signals for the drive system.

A crossection of a portion of plate 1 is shown in FIG. 2. Solar radiation 7 strikes plate 1 as indicated. Rays 8, 9, and 10 are refracted by lens 11, causing the rays to converge to form a solar image on the open end of optical fiber 12. Similarly, lens 13 forms a solar image on the open end of fiber 14. Similar action takes place at all other lenses in the matrix. Backpanel 15 holds the open ends of the fibers in proper position for receiving the respective solar images. The several fibers converge to form bundle 16, which passes through roof 17. The fibers must flex from east to west once each day and from west to east once each night. To avoid failures due to such flexure it is desirable that the free length (from collector to the hole in roof 17) be one meter or more.

In the preferred system, bundle 16 feeds to window 17 in the top of hot water tank 18. Radiation from the open end of bundle 16 strikes the bottom of tank 18, where it is absorbed and turned into sensible heat. The heat is transferred to water 19.

In the preferred system the matrix of lenses is a plastic sheet into which lenses have been molded. This sheet is stretched over the front of plate 1. Lenses may be simple convex (as shown), double convex, of Fresnel. The form shown in FIG. 2 presents a flat surface to the elements and is consequently easier to clean. The preferred shape in the plane of the sheet is hexagonal. However, square lenses as shown in FIG. 1 are satisfactory.

ALTERNATE SYSTEMS

Cable 16 may feed to a stove for cooking food, a thermodynamic engine for generating mechanical power, or just released into a room to provide both light and heat. Delivered radiation may be divided and fed to several using devices.

The matrix of the lenses may be replaced by a matrix of mirrors. This system has the advantage that only one surface is present to cause reflection loss. For the lens there are two such surfaces.

Figure 3:
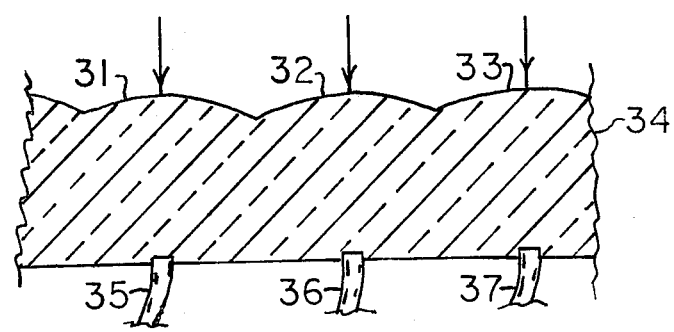
FIG. 3 shows a collector according to a second embodiment of the invention.

In one significant alternate system, plate 1 is a monolithic piece of transparent material having an index of refraction either the same as that of the core material of the fibers or having an index of refraction approximating that of the core material. Such a plate 34 is shown in FIG. 3. Surfaces 31, 32, and 33 are lenses molded into the front surface of the plate. When faced to the sun, the plate forms solar images on the open ends of optical fibers 35, 36, and 37. This system eliminates the reflection surface at the rear of the mosaic of FIG. 2 and the reflecting surfaces at the open ends of fibers 12 and 14. Since some 10% is lost at each of these reflecting surfaces, a gain of approximately 19% is realized from the structure of FIG. 3. The structure of FIG. 3 increases the mass of the system. This mass would be intolerable in the case of a single lens such as that of Dismer. However, mass of a concentrator goes up as the cube of a linear dimension. Solar power collected goes up as the square of a linear dimension. Consequently the increase in mass which would be prohibitive for a single lens system is entirely tolerable for a mosaic of small lenses.

The preferred lens material is plastic. However, glass or any other transparent material may be used.

Figure 4:
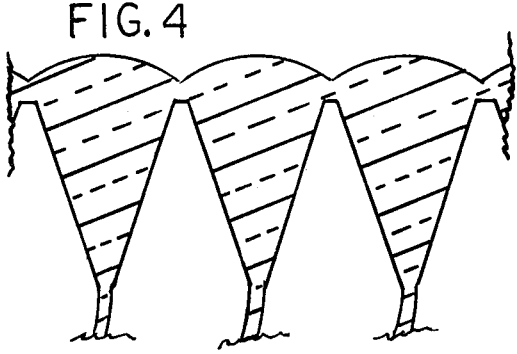
FIG. 4 shows a collector according to a third embodiment of the invention.

In another significant alternate system, each lens is attached to its respective fiber by means of a cone—as shown in FIG. 4. This reduces the mass to 33% of that of the plate system of FIG. 3. However, the rigidity of the matrix is reduced and complexity of manufacture is increased.

I claim:

1. A solar power system comprising a matrix of concentrators, an orientation system, a set of optical fibers, and a receiver;

said orientation system being adapted for causing said matrix of concentrators to face the sun;

each of said concentrators being adapted for concentrating solar radiation upon a first end of a respective optical fiber of said set of optical fibers;

said optical fibers being adapted for receiving and transmitting said concentrated solar radiation;

said optical fibers converging to form a bundle, said convergence being in the vicinity of said matrix;

said receiver being adapted for receiving said solar radiation from the second ends of said optical fibers;

said matrix of concentrators being a transparent plate having a set of lenses molded into its front surface and a set of truncated cones molded into its rear surface;

each of said lenses being adapted for developing a solar image upon the truncated surface of a respective cone of said set of truncated cones; and each of said optical fibers being adapted for receiving solar radiation delivered to the truncated surface of a respective cone of said set of truncated cones.

* * * * *